(12) United States Patent
Li et al.

(10) Patent No.: US 11,452,271 B2
(45) Date of Patent: Sep. 27, 2022

(54) HYDROPONIC APPARATUS AND HYDROPONIC METHOD

(71) Applicant: FUJIAN SANAN SINO-SCIENCE PHOTOBIOTECH CO., LTD., Quanzhou (CN)

(72) Inventors: Shaohua Li, Quanzhou (CN); Yangyin Huang, Quanzhou (CN); Zemin Song, Quanzhou (CN); Jing Li, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 169 days.

(21) Appl. No.: 16/966,465

(22) PCT Filed: Aug. 13, 2018

(86) PCT No.: PCT/CN2018/100242
§ 371 (c)(1),
(2) Date: Jul. 31, 2020

(87) PCT Pub. No.: WO2020/010665
PCT Pub. Date: Jan. 16, 2020

(65) Prior Publication Data
US 2021/0029903 A1 Feb. 4, 2021

(30) Foreign Application Priority Data

Jul. 11, 2018 (CN) .......................... 201810755327.8

(51) Int. Cl.
*A01G 31/02* (2006.01)
*A01G 7/04* (2006.01)

(52) U.S. Cl.
CPC .............. *A01G 31/02* (2013.01); *A01G 7/045* (2013.01)

(58) Field of Classification Search
CPC ........ A01G 31/02; A01G 9/028; A01G 9/047; A01G 31/04; A01G 31/045; B65G 47/082;
(Continued)

(56) References Cited

U.S. PATENT DOCUMENTS 4,028,847 A * 6/1977 Davis ................... A01G 31/042
165/59
4,166,341 A 9/1979 Vestergaard
(Continued)

FOREIGN PATENT DOCUMENTS

CN 204119930 U 1/2015
CN 206078446 U 4/2017
(Continued)

*Primary Examiner* — Joshua D Huson
*Assistant Examiner* — Megan J Moroney
(74) *Attorney, Agent, or Firm* — Bayramoglu Law Offices LLC

(57) ABSTRACT

A hydroponic apparatus includes a cultivation tank and planting containers. The cultivation tank includes an inner space and a top planting groove. Each of the planting containers includes a container body and a container brim The planting containers can be arranged on the planting groove along a width direction of the planting groove, and the planting containers can be moved along a length direction of the planting groove. A hydroponic method includes: placing the planting containers at n positions arranged along the planting groove, wherein each position corresponds to a plant growth and development stage, and is consistent with an order of the plant growth and development stages; and harvesting the plant at the position n at a specified time point, and moving the planting containers at other positions one by one to the positions corresponding to the next plant growth and development stages.

15 Claims, 2 Drawing Sheets

(58) Field of Classification Search
CPC ...... B65G 47/084; B65G 47/26; B65G 19/02; B65G 19/00; B65G 19/205
USPC .................... 198/468.01, 468.11, 717, 459.1
See application file for complete search history.

(56) References Cited

U.S. PATENT DOCUMENTS

| | | | | |
|---|---|---|---|---|
| 4,216,618 A * | 8/1980 | Haub | ................... | A01G 31/045 47/65 |
| 5,097,627 A * | 3/1992 | Roberts | ................ | A01G 31/045 47/64 |
| 10,765,074 B2 * | 9/2020 | Deforche | ............. | A01G 31/042 |
| 11,140,834 B2 * | 10/2021 | Yoshida | ................... | A01G 7/00 |
| 2018/0007850 A1 * | 1/2018 | Dufresne | ............... | B65G 1/026 |
| 2019/0183076 A1 * | 6/2019 | Muramoto | ............. | A01G 9/249 |

FOREIGN PATENT DOCUMENTS

| | | | | |
|---|---|---|---|---|
| CN | 106613865 A | * | 5/2017 | ............. A01G 31/02 |
| CN | 106613865 A | | 5/2017 | |
| JP | 2003339258 A | | 12/2003 | |

\* cited by examiner

HYDROPONIC APPARATUS AND HYDROPONIC METHOD

CROSS REFERENCE TO THE RELATED APPLICATIONS

This application is the national stage entry of International Application No. PCT/CN2018/100242, filed on Aug. 13, 2018, which is based upon and claims priority to Chinese Patent Application No. 2018/0755327.8, filed on Jul. 11, 2018, the entire contents of which are incorporated herein by reference.

TECHNICAL FIELD

The present invention relates to the field of hydroponic technologies, and specifically, to a hydroponic apparatus and a hydroponic method using the apparatus.

BACKGROUND

Hydroponics is a method of growing plants without soil, of which the core is fixing plant roots in plant containers, and making the roots naturally grow in plant nutrient solutions stored in a cultivation tank. The nutrient solutions nourishes plants in replacement of natural soil, so that the plants normally grow until harvest, and finish the whole growth cycle. At present, common methods used in plant factories include: planting plants onto planting boards, and keeping a sufficient distance between the plants until harvest; alternatively, keeping a certain distance between the plants, and when the distance between the plants is too small to meet space required for normal growth, transplanting the plants to increase the distance between the plants. Usually transplanting is performed twice or more times before harvest.

Both of the foregoing methods have major defects: The method of reserving a sufficient distance between plants all at once has low space utilization and low light or photoelectric utilization efficiency of plant production. The method of performing transplanting twice or more times can improve the light or photoelectric utilization efficiency of plant production, but still causes a light or photoelectric waste. Moreover, the method is labor-consuming and has high costs; in addition, the transplanting may cause damage to the plant roots, thus affecting growth and development of the plants.

SUMMARY

In view of the foregoing disadvantages of the prior art, an objective of the present invention is to provide a hydroponic apparatus and method can omit transplanting and efficiently utilize a cultivation space.

In order to achieve the foregoing and other related objectives, an implementation of the present invention provides a hydroponic apparatus including a cultivation tank and planting containers. The cultivation tank includes an inner space configured to contain nutrient solutions and a planting groove formed on the top. The planting container includes a container body and a container brim, where the container body is configured to grow a plant, the planting container can be arranged on the planting groove along a width direction of the planting groove through the container brim, and the planting container can be moved along a length direction of the planting groove.

In an implementation, the hydroponic apparatus includes a planting container moving mechanism, and the planting container moving mechanism includes a push mechanism configured to push the planting container to move along the planting groove and a rotating mechanism configured to rotate the push mechanism; the push mechanism includes a holder, a push rod and a push driving mechanism fixed on the holder; the holder is arranged in parallel with the planting groove, and is rotatable around an axis extending along the length direction of the planting groove; the push driving mechanism is connected to the push rod in a transmission manner, to move the push rod back and forth along the length direction of the planting groove; and the rotating mechanism includes a rotation driving mechanism, and the rotation driving mechanism is connected to the holder in a transmission manner, to drive the holder to rotate around the axis extending along the length direction of the planting groove.

In an implementation, the push driving mechanism includes a push motor fixed on an end of the holder extending along the length direction of the planting groove, a rotation shaft rotatable relative to the holder is mounted on another end of the holder extending along the length direction of the planting groove, the push rod is fixed on a closed-loop transmission rope, and both ends of the closed-loop transmission rope are tensioned on an output shaft of the push motor and the rotation shaft respectively.

In an implementation, the rotation driving mechanism includes a rotating motor, and the rotating motor is connected to the holder in a transmission manner.

In an implementation, the push motor and the rotating motor are controlled by a programmable logic controller (PLC).

In an implementation, the present invention provides a hydroponic method using the foregoing hydroponic apparatus. The method includes arranging n positions along the planting groove from a position 1 to a position n, where each position corresponds to a plant growth and development stage from a seedling stage to a harvest stage, and is consistent with an order of the plant growth and development stages; placing the planting containers containing plants in the corresponding growth and development stage at each position; and harvesting the plant at the position n at a specified time point, and moving the planting containers at other positions one by one to the positions corresponding to the next plant growth and development stages.

In an implementation, the method further includes: when the position 1 has no planting container, placing a new planting container containing plant seedlings at the position.

In an implementation, the method further includes: placing, at each position, a plurality of planting containers containing plants in same or similar growth and development stages.

In an implementation, the method further includes: determining a value of n according to a plant growth and development cycle from the seedling stage to the harvest stage of the plants.

The foregoing technical solutions provided in the implementations of the present invention effectively utilize the cultivation space to the greatest extent, substantially reduce the light or photoelectric waste, and improve the light or photoelectric utilization efficiency. Moreover, the technical solutions provide a suitable space to meet the needs of the plant growth and development according to the volumes of the cultivation plants, save the labor required for manual transplanting, and also resolve the adverse effects on the plant growth and development caused by the damage to the plants during manual transplanting.

DESCRIPTION OF REFERENCE NUMERALS

Figure 1:
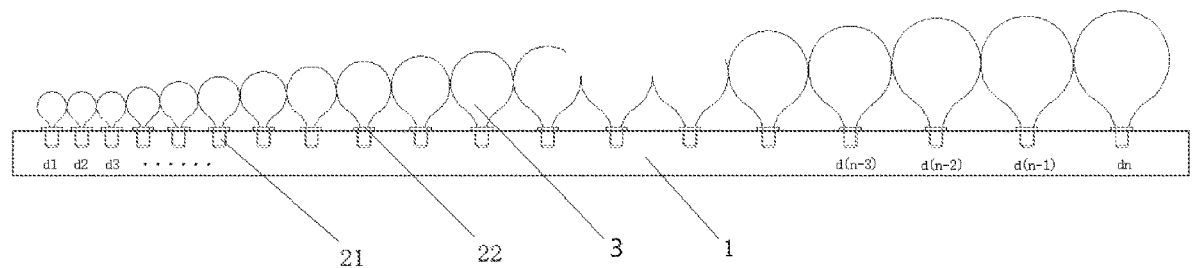
FIG. 1 is a schematic diagram of a hydroponic method based on position substitution movement according to an embodiment of the present invention.

1 Cultivation tank
11 Planting groove
2 Planting container
21 Container body
22 Container brim
3 Plant
4 Moving mechanism
41 Holder
42 Movement driving motor
421 Movement driving motor shaft
43 Push rod
44 Transmission rope
45 Rotation driving motor

DETAILED DESCRIPTION OF THE EMBODIMENTS

The implementations of the present invention are described below with reference to specific embodiments. Those skilled in the art can easily understand other advantages and effects of the present invention according to the content disclosed in the specification.

It should be noted that the structures, proportions, sizes, and the like shown in the drawings of the specification, in coordination with the content disclosed in the specification, are only used to help a person skilled in the art to read and understand, and it is not intended to limit the conditions under which the present invention can be implemented and therefore has no technical significance. Any modifications to the structure, changes to the proportional relationship or the adjustment on the size should fall within the scope of the technical content disclosed by the present invention without affecting the effects and the objectives that can be achieved by the present invention. At the same time, the terms such as "upper", "lower", "left", "right", "middle" and "one" as used in this specification are only for ease of description and are not intended to limit the implementation scope of the present invention, and the change or adjustment of the relative relationship is considered to be within the implementation scope of the present invention provided that the technical content is not substantially changed.

The present invention provides a hydroponic method can omit transplanting, efficiently utilize a cultivation space, and improve light or photoelectric utilization efficiency. In the method, planting containers are movably fitted with the cultivation tank, unlike the prior art in which the planting containers are fixedly arranged on the cultivation tank.

Figure 2:
FIG. 2 is a schematic front view of a hydroponic apparatus according to an embodiment of the present invention.
Figure 3:
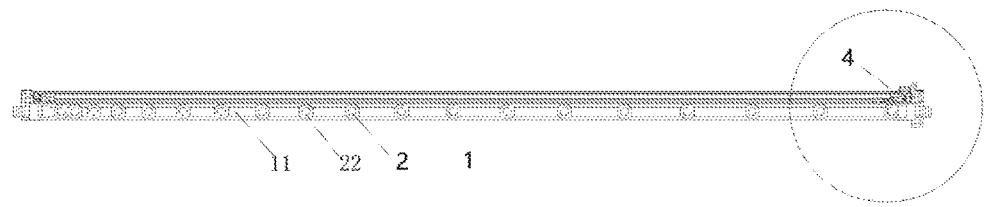
FIG. 3 is a schematic top view of the hydroponic apparatus shown in FIG. 2.

FIG. 1 to FIG. 3 show a specific embodiment of the hydroponic method according to the present invention.

As shown in FIG. 1 to FIG. 3, a hydroponic apparatus includes a cultivation tank 1 and planting containers 2. The cultivation tank 1 includes an inner space containing nutrient solutions, and a planting groove 11 with a certain length is provided at an upper portion of the cultivation tank 1. A container body 21 of the planting container 2 enters from the planting groove 11 into the cultivation tank 1, and the planting container 2 is arranged on the cultivation tank 1 through a container brim 22 thereof, disposed on the planting groove 11 in a width direction. Plants 3 are planted in the planting containers 2, and roots of the plants grow into the nutrient solutions contained in the cultivation tank 1 through holes on the cultivation containers to absorb nutrients therefrom.

The planting containers 2 are arranged along a length direction of the planting groove 11. The container brims 22 of the planting containers 2 are arranged on the cultivation tank 1, are not fixed with the cultivation tank 1. Therefore, the planting containers 2 are movable along the length direction of the planting groove 11. Therefore, according to the size of the plants in the planting containers 2, spacing between adjacent planting containers 2 can be adjusted by moving the planting containers 2, to obtain suitable plant spacing for plant growth. Under the circumstance of ensuring the growth space required for the plants 3, the cultivation space is fully utilized. The planting containers 2 can be moved manually, or by a moving mechanism 4 that is arranged on the cultivation tank 1 and configured to move the planting containers 2. In the present invention, for the spacing adjustment of the planting containers 2, the planting containers 2 can be moved at specified time intervals according to a plant growth cycle, for example, moved once a day or once every few days.

Based on the hydroponic apparatus taking the foregoing embodiment as an example, the present invention further provides a hydroponic method based on position substitution movement. As shown in FIG. 1, along the direction of the planting groove of the cultivation tank 1 from left to right, according to an order of plant growth and development stages from a seedling stage to a harvest stage, plants 3 in different growth and development stages are planted one by one. The plant 3 at a position d1 (that is, a position 1) is a newly planted seedling, and the plant 3 at a position dn (that is, a position n) is a plant to be harvested. At time points according to a plant growth and development cycle, the plant 3 to be harvested at the position dn is harvested first, then the plant 3 at the position d(n−1) is moved to the position dn, and next the plant 3 at the position d(n−2) is moved to the position d(n−1), and so on, until the plant 3 at the position d1 is moved to the position d2. Finally, a new seedling is planted at the position d1, that is, a new planting container 2 containing the seedling is placed at the position d1. Although each position corresponds to only one planting container 2 in FIG. 1, in other embodiments, one position can also represent a plurality of planting containers 2 continuously placed. The plants 3 in the plurality of planting containers 2 are in the same or similar growth and development stages, and the movement principle is same as the above. A value of n is determined according to the plant growth and development cycle from the seedling stage to the harvest stage. For example, the growth and development cycle of a certain plant from the seedling stage to the harvest stage is 30 days, n is 30, and the plant is moved once a day; or n is 15, the plant is moved once every two days, and two planting containers are placed at each position. When a plurality of the planting containers 2 containing plants in the same or similar growth and development stages are continuously placed at one position, n is 30, the plants are moved once a day, and the plurality of planting containers containing the plants in the same or similar growth and development stages at each position are moved.

Figure 4:
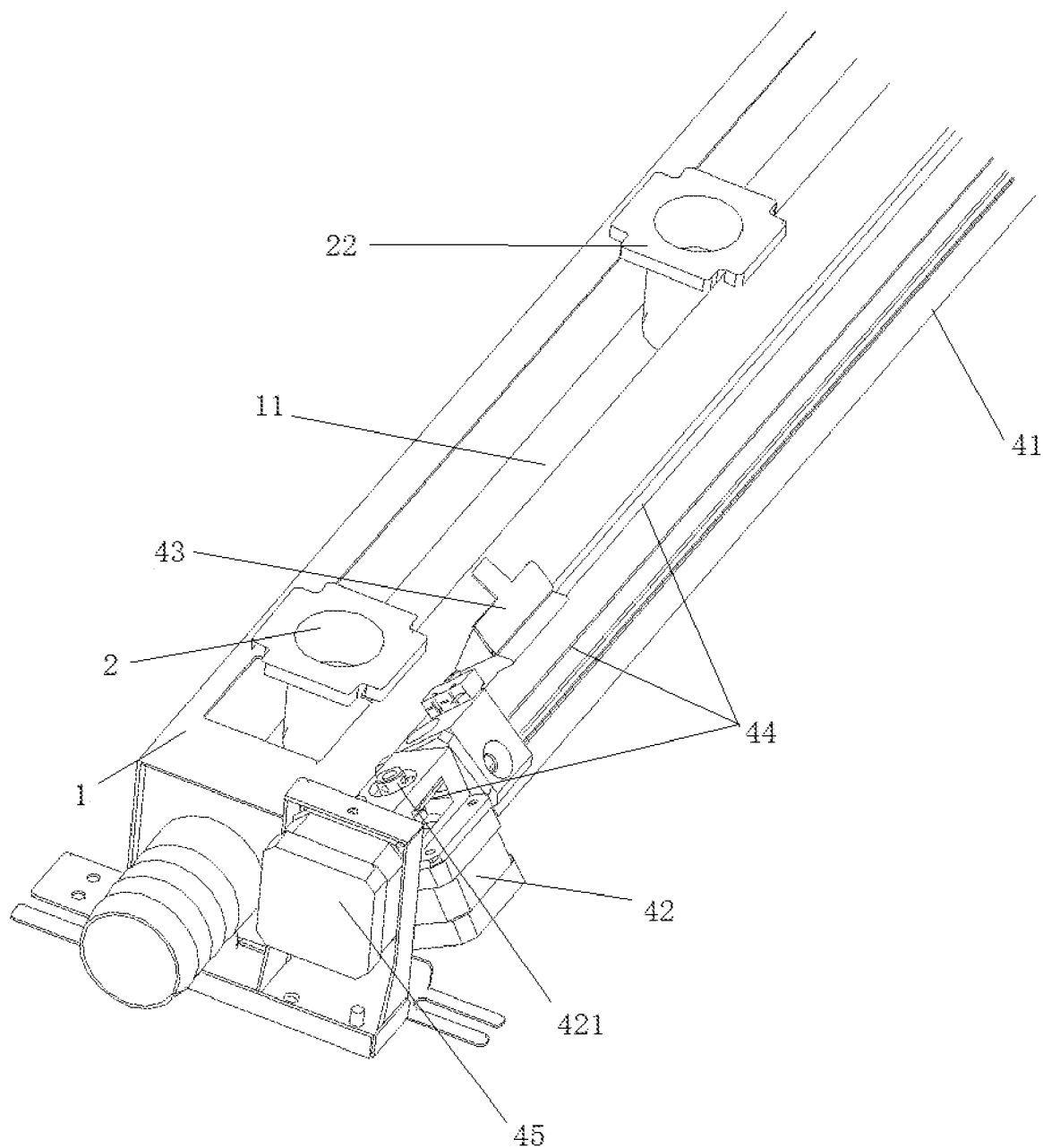
FIG. 4 is a schematic structural diagram of a planting container moving mechanism according to an embodiment of the present invention.

FIG. 4 shows an embodiment of a planting container moving mechanism. In the present invention, the planting container moving mechanism generally may include a push mechanism configured to push the planting containers to move along the planting groove and a rotating mechanism configured to rotate the push mechanism. As shown in FIG. 4, in this embodiment, the push mechanism includes a holder 41, a push motor 42, a push rod 43 and a closed-loop transmission rope 44, and the rotating mechanism includes a rotating motor 45. The holder 41 is arranged in parallel with the planting groove 11, that is, the holder 41 extends along the length direction of the planting groove 11, and can rotate around the length direction thereof as an axis. That is, both ends in a length direction of the holder 41 are rotatably supported. Specifically, one end of the holder 41 is rotatably supported on the cultivation tank 1 or another support structure connected or not connected to the cultivation tank 1, and another end is connected to an output shaft of the rotating motor 45 in a transmission manner. For example, the other end is connected to the output shaft of the rotating motor 45 by a coupling, and the rotating motor 45 drives the holder 41 to rotate back and forth. The rotating motor 45 may be fixed on the cultivation tank 1 or another support structure connected or not connected to the cultivation tank 1. The push motor 42 is fixed on an end of the holder 41 along the length direction of the holder 41. A rotation shaft (not shown) is mounted on another end of the holder 41 along the length direction, and the rotation shaft can rotate relative to the holder. Both ends of the closed-loop transmission rope 44 are tensioned on an output shaft of the push motor 42 and the rotation shaft mounted on the holder 41 respectively. The push rod 43 is fixed on the transmission rope 44 (for example, a steel rope), and can move back and forth with the transmission rope 44 along the length direction of the holder 41. The push rod 43 is controlled by the rotating motor 45, and can swing between an initial angle at which the push rod does not interfere with the container brims 22 of the planting containers 2 in the length direction of the planting groove 11 and a working angle at which the push rod can interfere with the container brims 22.

When the position of the planting container 2 on the cultivation tank 1 needs to be moved, the push motor 42 first drives the transmission rope 44, thereby driving the push rod 43 to move to a side of the planting container 2 to be pushed. Then, the rotating motor 45 drives the holder 41, thereby driving the push motor 42, the push rod 43 and the transmission rope 44 to rotate as a whole, to rotate the push rod 43 from the initial angle to the working angle. Then, the push motor 42 drives the transmission rope 44, thereby driving the push rod 43 to move. When the push rod 43 is in contact with the container brim 22 of the planting container 2, the planting container 2 can be pushed to move towards an expected direction. After the planting container 2 reaches a predetermined position, the rotating motor 45 may rotate reversely to drive the holder 41, thereby driving the push rod 43 to return to the initial angle.

In order to achieve a higher degree of automation, the push motor 42 and the rotating motor 45 may be controlled by a programmable logic controller (PLC), to automatically implement that each planting container 2 is moved for a predetermined distance at a predetermined time, and achieve automation control of movable planting based on position substitution.

In view of the above, the hydroponic apparatus and hydroponic method provided by the present invention adopt a cultivation manner without transplanting, thereby saving labor required for manual transplanting, and resolving adverse effects on the plant growth and development caused by the damage to the plants during manual transplanting. More importantly, by using such a cultivation manner, various higher-density plant layouts can be achieved through proper combinations, so that a suitable space meeting the plant growth and development requirements is provided according to the volumes of the cultivation plants, thereby making full use of the cultivation space, substantially reducing the light or photoelectric waste, and improving the light or photoelectric utilization efficiency.

The foregoing embodiments merely illustrate the principles and effects of the present invention, and are not intended to limit the present invention. Any person skilled in the art can modify or change the foregoing embodiments without departing from the spirit and scope of the present invention. Therefore, all equivalent modifications or changes made by a person of ordinary skill in the art without departing from the spirit and technical idea of the present invention shall be covered by the claims of the present invention.

What is claimed is:

1. A hydroponic apparatus, comprising a cultivation tank and a plurality of planting containers, wherein
    the cultivation tank comprises an inner space configured to contain nutrient solutions and a planting groove formed on the top of the cultivation tank; and
    each of the plurality of planting containers comprises a container body and a container brim, each of the plurality of planting containers is capable of being arranged on the planting groove along a width direction of the planting groove through the container brim, each of the plurality of planting containers is movable along a length direction of the planting groove, and each of the plurality of planting containers is configured to grow a plant;
    the hydroponic apparatus comprises a planting container moving mechanism, and the planting container moving mechanism comprises a push mechanism configured to push the plurality of planting containers to move along the planting groove and a rotating mechanism configured to rotate the push mechanism;
    the push mechanism comprises a holder, a push rod and a push driving mechanism fixed on the holder;
    the holder is arranged in parallel with the planting groove, and is rotatable around an axis extending along the length direction of the planting groove;
    the push driving mechanism is connected to the push rod in a transmission manner, to move the push rod back and forth along the length direction of the planting groove; and
    the rotating mechanism comprises a rotation driving mechanism, and the rotation driving mechanism is connected to the holder in a transmission manner, to drive the holder to rotate around the axis extending along the length direction of the planting groove.

2. The hydroponic apparatus according to claim 1, wherein
    the push driving mechanism comprises a push motor fixed on an end of the holder extending along the length direction of the planting groove, a rotation shaft rotatable relative to the holder is mounted on another end of the holder extending along the length direction of the planting groove, the push rod is fixed on a closed-loop transmission rope, and both ends of the closed-loop transmission rope are tensioned on an output shaft of the push motor and the rotation shaft respectively.

3. The hydroponic apparatus according to claim 2, wherein
the rotation driving mechanism comprises a rotating motor, and the rotating motor is connected to the holder in a transmission manner.

4. The hydroponic apparatus according to claim 3, wherein
the push motor and the rotating motor are controlled by a programmable logic controller (PLC).

5. The hydroponic apparatus according to claim 1, wherein
the rotation driving mechanism comprises a rotating motor, and the rotating motor is connected to the holder in a transmission manner.

6. A hydroponic method using the hydroponic apparatus according to claim 1, comprising:
providing the hydroponic apparatus of claim 1;
arranging n positions along the planting groove from a position 1 to a position n, wherein each position in the n positions corresponds to a plant growth and development stage from a seedling stage to a harvest stage, and is consistent with an order of plant growth and development stages;
placing the plurality of planting containers containing plants at corresponding positions in the order of the growth and development stages; and
harvesting a plant at the position n at a specified time point, and moving each of the plurality of planting containers containing the plants at remaining positions one by one to a position corresponding to a next plant growth and development stage.

7. The hydroponic method according to claim 6, wherein
when the position 1 has no planting container, a new planting container containing plant seedlings is placed at the position 1.

8. The hydroponic method according to claim 6, wherein
each position is designed to place a plurality of planting containers containing plants in a same or similar growth and development stage.

9. The hydroponic method according to claim 8, wherein
when the position 1 has no planting container, a new planting container containing plant seedlings is placed at the position 1.

10. The hydroponic method according to claim 6, wherein
a value of n is determined according to a number of movements of the plurality of planting containers required for a plant growth and development cycle from the seedling stage to the harvest stage, and the plurality of planting containers are moved once a day or once every few days according to a speed of plant growth and development.

11. The hydroponic method according to claim 10, wherein
when the position 1 has no planting container, a new planting container containing plant seedlings is placed at the position 1.

12. The hydroponic method according to claim 6, wherein
the push driving mechanism comprises a push motor fixed on an end of the holder extending along the length direction of the planting groove, a rotation shaft rotatable relative to the holder is mounted on another end of the holder extending along the length direction of the planting groove, the push rod is fixed on a closed-loop transmission rope, and both ends of the closed-loop transmission rope are tensioned on an output shaft of the push motor and the rotation shaft respectively.

13. The hydroponic method according to claim 12, wherein
the rotation driving mechanism comprises a rotating motor, and the rotating motor is connected to the holder in a transmission manner.

14. The hydroponic method according to claim 13, wherein
the push motor and the rotating motor are controlled by a programmable logic controller (PLC).

15. The hydroponic method according to claim 6, wherein
the rotation driving mechanism comprises a rotating motor, and the rotating motor is connected to the holder in a transmission manner.

* * * * *